US009961293B2

(12) United States Patent
Shin et al.

(10) Patent No.: US 9,961,293 B2
(45) Date of Patent: May 1, 2018

(54) METHOD FOR PROVIDING INTERFACE USING MOBILE DEVICE AND WEARABLE DEVICE

(71) Applicant: LG ELECTRONICS INC., Seoul (KR)

(72) Inventors: Myeongsoo Shin, Seoul (KR); Yuri Lee, Seoul (KR); Hyeonhui Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days. days.

(21) Appl. No.: 15/533,352

(22) PCT Filed: Dec. 5, 2014

(86) PCT No.: PCT/KR2014/011871
§ 371 (c)(1),
(2) Date: Jun. 5, 2017

(87) PCT Pub. No.: WO2016/088922
PCT Pub. Date: Jun. 9, 2016

(65) Prior Publication Data
US 2017/0353686 A1    Dec. 7, 2017

(51) Int. Cl.
*H04N 5/44* (2011.01)
*H04N 5/445* (2011.01)

(52) U.S. Cl.
CPC ... *H04N 5/4403* (2013.01); *H04N 2005/4444* (2013.01)

(58) Field of Classification Search
CPC .................................................. H04N 5/4403

USPC .......................................................... 348/460
See application file for complete search history.

(56) References Cited

U.S. PATENT DOCUMENTS

| 2013/0254705 | A1* | 9/2013 | Mooring | G06F 3/0488 715/784 |
| 2014/0168063 | A1* | 6/2014 | Kita | G06F 3/017 345/156 |
| 2014/0273849 | A1* | 9/2014 | Lee | G06F 1/1694 455/41.2 |
| 2014/0298353 | A1 | 10/2014 | Hsu et al. | |

FOREIGN PATENT DOCUMENTS

| CN | 104182190 | 12/2014 |
| WO | 2014113891 | 7/2014 |
| WO | 2014175505 | 10/2014 |

OTHER PUBLICATIONS

PCT International Application No. PCT/KR2014/011871, Written Opinion of the International Searching Authority dated Jul. 29, 2015, 19 pages.

* cited by examiner

*Primary Examiner* — Michael Teitelbaum
*Assistant Examiner* — Justin Sanders
(74) *Attorney, Agent, or Firm* — Lee, Hong, Degerman, Kang & Waimey

(57) ABSTRACT

Disclosed are a mobile device for editing an image for a wearable device and a method for controlling the mobile device. The mobile device according to the present specification can provide an interface for editing an image when a wearable device is proximally located. Additionally, the interface has the same actual form as a display unit of the wearable device and can be changed on the basis of movements of the wearable device relative to the mobile device.

20 Claims, 12 Drawing Sheets

(a)

(b)

(a)

(b)

(a)

(b)

(a)

(b)

(a)

(b)

METHOD FOR PROVIDING INTERFACE USING MOBILE DEVICE AND WEARABLE DEVICE

CROSS-REFERENCE TO RELATED APPLICATIONS

This application is the National Stage filing under 35 U.S.C. 371 of International Application No. PCT/KR2014/011871, filed on Dec. 5, 2014, the contents of which are all hereby incorporated by reference herein in its entirety.

TECHNICAL FIELD

The present invention relates to a mobile device, a wearable device, and a method of providing an interface using the mobile device and the wearable device.

BACKGROUND ART

FIG. 1 is a diagram for an example of a wearable device.

Wearable devices having a display of various shapes are developing. For example, FIG. 1 shows a wearable device 200 having a display unit 220 of a circle form. Yet, a picture generally has a rectangular form of a ratio such as 4:3 or 16:9.

Hence, as shown on the top of FIG. 1, the whole picture can be displayed on the circle display unit 200. Yet, the display unit 220 of the wearable device 200 is relatively small. Hence, as shown on the top of FIG. 1, if the whole picture is displayed on the circle display unit 200, an excessively small picture is displayed.

Meanwhile, as shown on the bottom of FIG. 1, the circle display unit 200 can be filled with a displayed picture. Yet, in this case, a part of the picture is not displayed. And, the picture is not displayed in accordance with the intention of a user.

Hence, it is necessary for the user of the wearable device 200 to edit the picture to make the picture fit the display unit 200 of the wearable device 200. Yet, since the wearable device 200 has the relatively small display unit 220, it is not easy to edit the picture. And, the user can edit the picture using an image editing program of a different device. In this case, it is necessary to consider a size, resolution, and a shape of the display unit 220 of the wearable device 200. Moreover, it is necessary to have a separate processor for transmitting an edited picture to the wearable device 200.

Therefore, it is necessary to have an interface capable of being easily used and processing an intuitive image.

DISCLOSURE OF THE INVENTION

Technical Task

An object of the present specification is to provide a mobile device capable of editing an image based on device information of a wearable device and an interaction method between the mobile device and the wearable device. In particular, the object of the present specification is to provide a more enhanced interface for editing and transmitting an image by providing an interface corresponding to a display unit of the wearable device.

Technical Solution

To achieve these and other advantages and in accordance with the purpose of the present invention, as embodied and broadly described, according to one embodiment, a mobile device includes a display unit configured to display an image and receive a touch input, a communication unit configured to communicate with a wearable device, a detecting unit configured to detect a relative position of the wearable device for the mobile device, and a processor configured to control the display unit, the communication unit, and the detecting unit, the processor configured to display a first image on the display unit, the processor, if the wearable device is positioned in the vicinity of the mobile device, configured to receive device information of the wearable device from the wearable device using the communication unit, the processor configured to display an interface for editing the first image on the first image based on the received device information. In this case, the interface has a shape practically identical to a shape of a display of the wearable device and can be changed based on a change of a relative position of the wearable device for the mobile device.

To further achieve these and other advantages and in accordance with the purpose of the present invention, according to a different embodiment, a wearable device includes a display unit configured to display an image, a communication unit configured to communicate with a mobile device, and a processor configured to control the display unit and the communication unit, the processor, if the mobile device is positioned in the vicinity of the wearable device, configured to transmit device information of the wearable device to the mobile device using the communication unit, the processor configured to display an image received from the mobile device on the display unit. In this case, if the device information is transmitted, the mobile device provides an interface for editing the image displayed on the mobile device to a user and the interface has a shape practically identical to a shape of the display unit of the wearable device and can be changed based on a change of a relative position of the wearable device for the mobile device.

Advantageous Effects

According to the present specification, a mobile device can provide a more intuitive image editing method.

According to the present specification, a mobile device can generate an image appropriate for a wearable device by providing an interface of a shape identical to a shape of a display unit of the wearable device.

According to the present specification, since an image editing interface is controlled based on an interaction between a mobile device and a wearable device, it is able to easily edit an image.

According to the present specification, since a wearable device controls an interface for editing an image based on a gesture, it is able to provide a more intuitive and enhanced image editing method.

BEST MODE

Reference will now be made in detail to the preferred embodiments of the present invention, examples of which are illustrated in the accompanying drawings. While embodiments are concretely described with reference to the attached diagrams and the contents written on the diagrams, the present specification may be non-restricted or non-limited to the embodiments.

Although terminologies used in the present specification are selected from general terminologies used currently and widely in consideration of functions, they may be changed in accordance with intentions of technicians engaged in the corresponding fields, customs, advents of new technologies and the like. Occasionally, some terminologies may be arbitrarily selected by the applicant(s). In this case, the meanings of the arbitrarily selected terminologies shall be described in the corresponding part of the detailed description of the specification. Therefore, terminologies used in the present specification need to be construed based on the substantial meanings of the corresponding terminologies and the overall matters disclosed in the present specification rather than construed as simple names of the terminologies.

Figure 1:
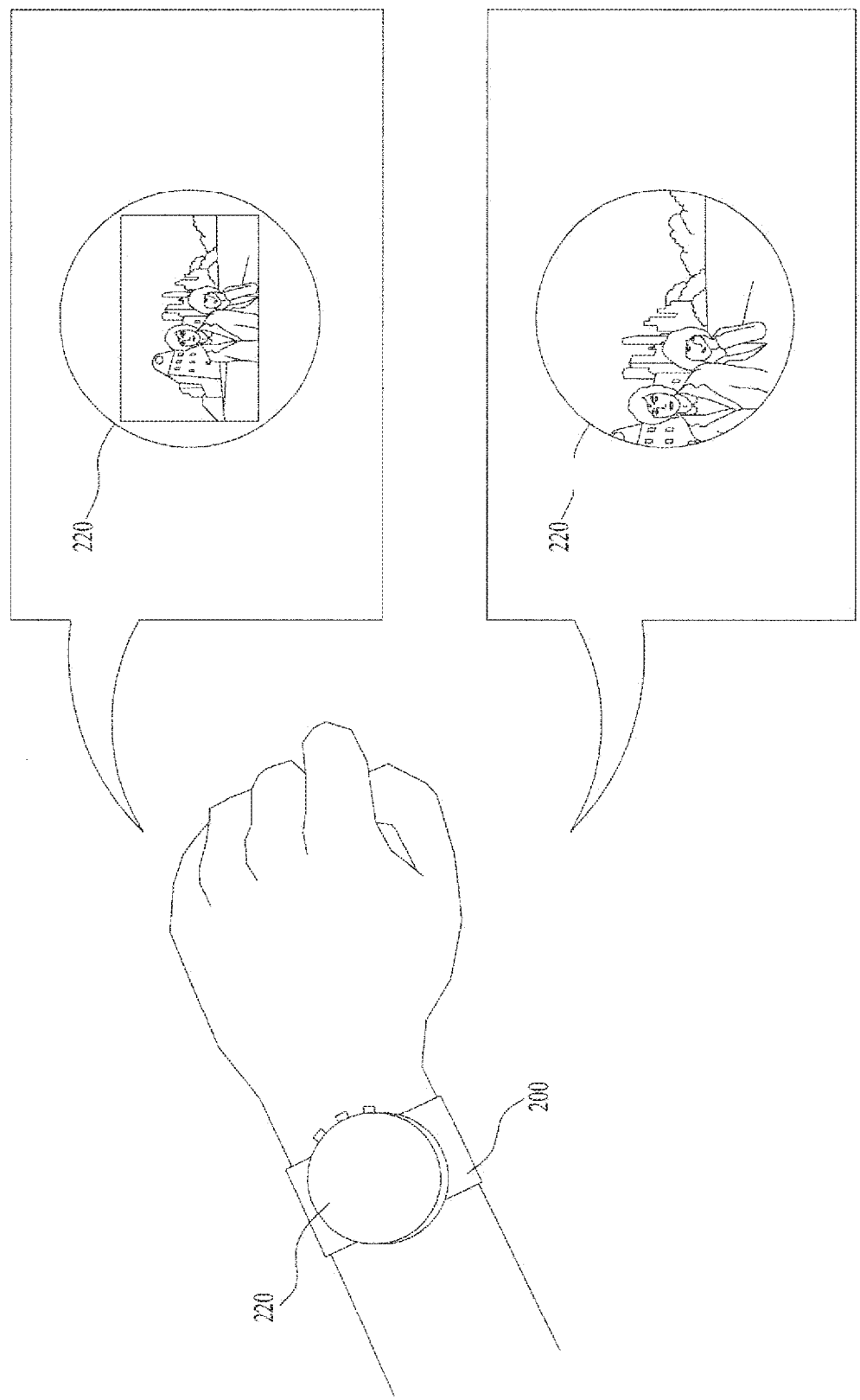
FIG. 1 is a diagram for an example of a wearable device.
Figure 2:
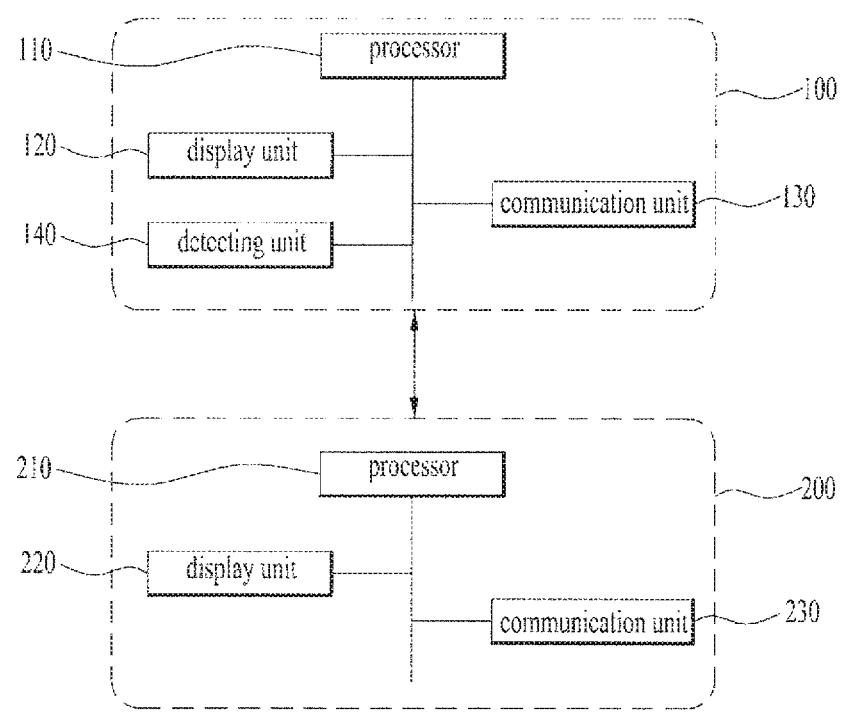
FIG. 2 is a diagram for configurations of a mobile device and a wearable device according to one embodiment.

FIG. 2 is a diagram for configurations of a mobile device and a wearable device according to one embodiment.

A mobile device 100 according to one embodiment of the present specification can include a display unit 120 configured to display an image and receive a touch input, a communication unit 130 configured to communicate with a wearable device 200, a detecting unit 140 configured to detect a relative position of the wearable device 200 for the mobile device 100, and a processor 110 configured to control the display unit 120, the communication unit 130, and the detecting unit 140.

The display unit 120 displays at least one image and can receive a touch input. The display unit 120 can include an LCD (liquid crystal display), a plasma display, or a display of a different type. And, the display unit 120 can include a touch sensor. In particular, the display unit 120 can include a touch sensitive display unit. The touch sensor can be positioned on the display unit 120 or in the inside of the display unit 120. The touch sensor can sense various touch inputs such as a contact touch input or a non-contact touch input including a sliding touch input, a multi touch input, a long-press touch input, a short-press touch input, a drag touch input, a hovering input, and a flicking touch input. Moreover, the touch sensor can sense a touch input inputted by various input tools such as a touch pen, a stylus pen, and the like. The touch sensor can forward a result of sensing a touch input to the processor 110.

The communication unit 130 communicates with the wearable device 200 and can receive device information of the wearable device 200 from the wearable device 200. The communication unit 130 can receive information from at least one external device. The communication unit 130 performs communication via a wired or wireless network using various protocols and can transmit/receive data. For example, the communication unit 130 can use WLAN (Wireless LAN), IEEE 802.11 based wireless LAN communication, Wibro (Wireless Broadband), Wimax (World Interoperability for Microwave Access), HSDPA (High Speed Downlink Packet Access), Bluetooth, NFC (Near Field Communication) standard, etc. to access a wireless network. And, the communication unit 130 can access the Internet via a wired/wireless network.

The detecting unit 140 can detect a relative position of the wearable device 200 for the mobile device 100. The detecting unit 140 can include at least one sensor for sensing a position of the wearable device 200. For example, the detecting unit 140 can include an image sensor and/or a proximity sensor. For example, the detecting unit 140 can detect a position of the wearable device 200 via image processing. In order to detect a position of the wearable device 200, the detecting unit 140 can include one or more image sensors and/or proximity sensors. The detecting unit 140 can detect a position of the wearable device 200 using a magnetic field and/or an electric field. For example, the detecting unit 140 can include one or more magnetic field sensors and/or electric field sensors located at a different position. The detecting unit 140 compares values measured by the electric field sensors and/or the magnetic field sensors located at a different position with each other to detect a position of the wearable device 200. The detecting unit 140 can include a touch sensor. The detecting unit 140 senses a touch input caused by the wearable device 200 to sense a position of the wearable device 200.

The detecting unit 140 can sense a position of the wearable device 200 by selectively combining the aforementioned sensing methods. For example, if a distance between the mobile device 100 and the wearable device 200 is equal to or greater than a predetermined distance, the detecting unit 140 senses a position of the wearable device 200 using an image sensor. If the distance between the mobile device 100 and the wearable device 200 is less than the predetermined distance, the detecting unit 140 can detect a position of the wearable device 200 using a magnetic field sensor, an electric field sensor, a proximity sensor and/or a touch sensor. The aforementioned sensors of the detecting unit 140 are an example only. It may use sensors of a different type to determine a relative position of the wearable device 200 for the mobile device 100.

If a side to which the display unit 120 of the mobile device 100 is deployed corresponds to the front side, the sensors of the detecting unit 140 can be deployed to the rear side of the mobile device 100. For example, the sensors of the detecting unit 140 can sense a position of the wearable device 200 at the rear side of the mobile device 100.

The detecting unit 140 can detect a position of the wearable device 200 together with the communication unit 130. For example, the detecting unit 140 can include 2 sensors respectively existing at opposite edges. In this case, the detecting unit 140 measures a distance between the wearable device 200 and the mobile device 100 using the communication unit 130 and determines a position of the wearable device 200 using the sensors of the detecting unit 140.

The mobile device 100 according to the present specification may not require an absolute position of the wearable device 200. In particular, the mobile device 100 according to the present specification may detect a relative position of the wearable device 200 only for the mobile device 100. Yet, the mobile device 100 can obtain the absolute position of the wearable device 200 using a GPS of the wearable device 200.

The processor can control the display unit 120, the communication unit 130, and the detecting unit 140. And, the processor 110 can control other configurations included in the mobile device 100. The processor 110 can execute various applications by processing data of the mobile device 100. The processor 110 can control the mobile device 100 and contents executed in the mobile device 100 based on a command The wearable device 200 according to one embodiment of the present specification can include a display unit 220 configured to display at least one image, a communication unit 230 configured to communicate with the mobile device 100, and a processor 210 configured to control the display unit 220 and the communication unit 230.

The display unit 220 can displays at least one image. The display unit 220 can include an LCD (liquid crystal display), a plasma display, or a display of a different type. And, the display unit 220 can include a touch sensor. In particular, the display unit 220 can include a touch sensitive display unit. The touch sensor can be positioned on the display unit 220 or in the inside of the display unit 220. The touch sensor can sense various touch inputs such as a contact touch input or a non-contact touch input including a sliding touch input, a multi touch input, a long-press touch input, a short-press touch input, a drag touch input, a hovering input, and a flicking touch input. Moreover, the touch sensor can sense a touch input inputted by various input tools such as a touch pen, a stylus pen, and the like. The touch sensor can forward a result of sensing a touch input to the processor 210. For example, the display unit 220 may have a circle shape or a rectangular shape.

The communication unit 230 communicates with the mobile device 100 and can transmit device information of the wearable device 200 to the mobile device 100. The communication unit 230 can receive information from at least one external device. The communication unit 230 performs communication via a wired or wireless network using various protocols and can transmit/receive data. For example, the communication unit 230 can use WLAN (Wireless LAN), IEEE 802.11 based wireless LAN communication, Wibro (Wireless Broadband), Wimax (World Interoperability for Micorwave Access), HSDPA (High Speed Downlink Packet Access), Bluetooth, NFC (Near Field Communication) standard, etc. to access a wireless network. And, the communication unit 230 can access the Internet via a wired/wireless network.

The processor 210 can control the display unit 220 and the communication unit 130. And, the processor 110 can control other configurations included in the wearable device 200. The processor 210 can execute various applications by processing data of the wearable device 200. The processor 210 can control the wearable device 200 and contents executed in the wearable device 200 based on a command The mobile device 100 and the wearable device 200 can further include configurations not depicted in FIG. 2. For example, the mobile device 100 and/or the wearable device 200 can further include a memory, a power source, housing, an audio receiving unit, an audio outputting unit, a location determination unit, or an image sensing unit. The image sensing unit can sense an image using visible ray, infrared ray, ultraviolet ray, a magnetic field and/or sound wave.

The aforementioned configurations can be selectively combined according to selection of a manufacturer, or a type of the mobile device 100 and/or the wearable device 200. The configurations can be connected with each other via a bus and can be respectively controlled by the processors 110/210.

Meanwhile, the configuration diagram of the mobile device 100 and the wearable device 200 shown in FIG. 2 corresponds to a block diagram according to one embodiment. Blocks represented as being separated show hardware configuration units in a manner of being logically distinguished. Hence, each of the configuration units of the mobile device 100 can be implemented by a single chip or a plurality of chips depending on the design of the mobile device 100. And, each of the configuration units of the wearable device 200 can be implemented by a single chip or a plurality of chips depending on the design of the wearable device 200.

Meanwhile, the mobile device and the wearable device according to the present specification can be controlled based on various inputs. For example, the mobile device 100 and/or the wearable device 200 can include a physical button and can receive an input from the physical button. And, the mobile device 100 and/or the wearable device 200 can include a voice receiving unit, perform voice recognition based on received voice, and can be controlled based on the voice recognition. Specifically, the voice recognition can be performed in a unit of a syllable, a word, or a sentence. The mobile device 100 and/or the wearable device 200 can be controlled by combining the recognized syllable, the word, or the sentence. The mobile device 100 and/or the wearable device 200 can perform image analysis using an image sensing unit and can be controlled based on an analyzed image. The mobile device 100 and/or the wearable device 200 can include a touch sensing unit and can be controlled based on a touch inputted on the touch sensing unit. Moreover, the mobile device 100 and/or the wearable device 200 can be controlled based on a combination of the aforementioned inputs.

And, operations of the mobile device 100 and the wearable device 200 described in the following can be performed by the mobile device 100 and/or the wearable device 200 mentioned earlier with reference to FIG. 2.

Figure 3A:
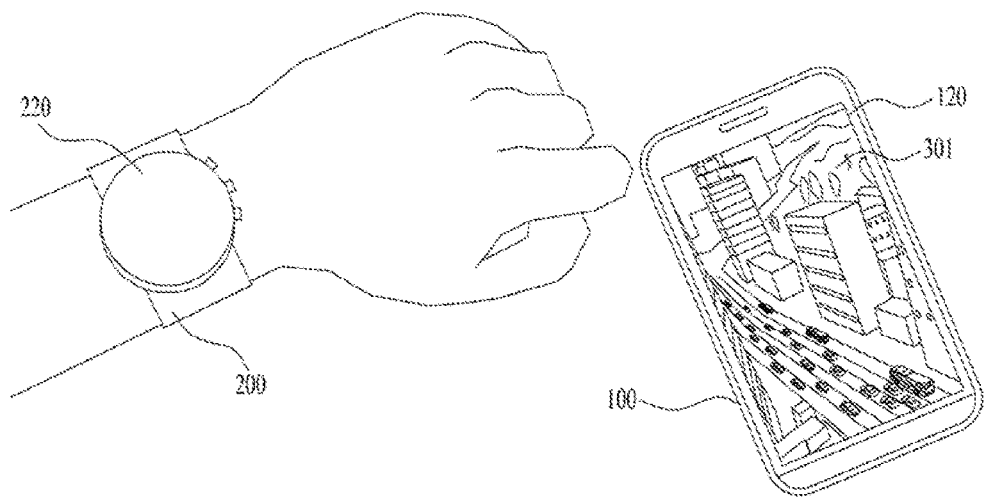
FIGS. 3a to 3c are diagrams for an interface of a mobile device provided according to one embodiment.
Figure 3B:
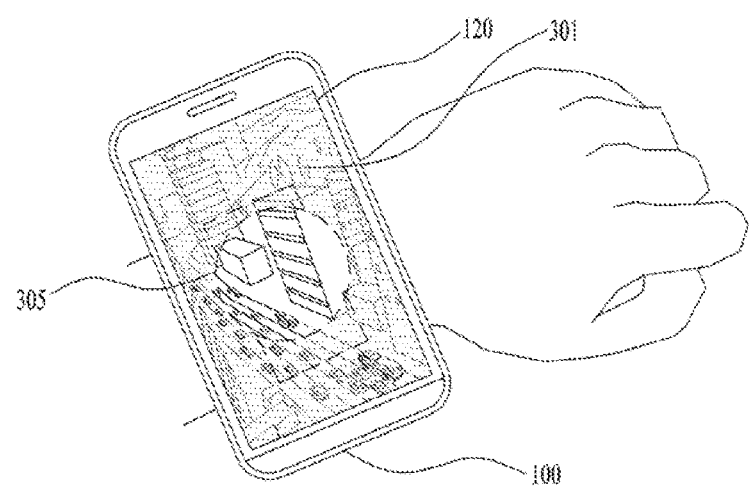
Figure 3C:
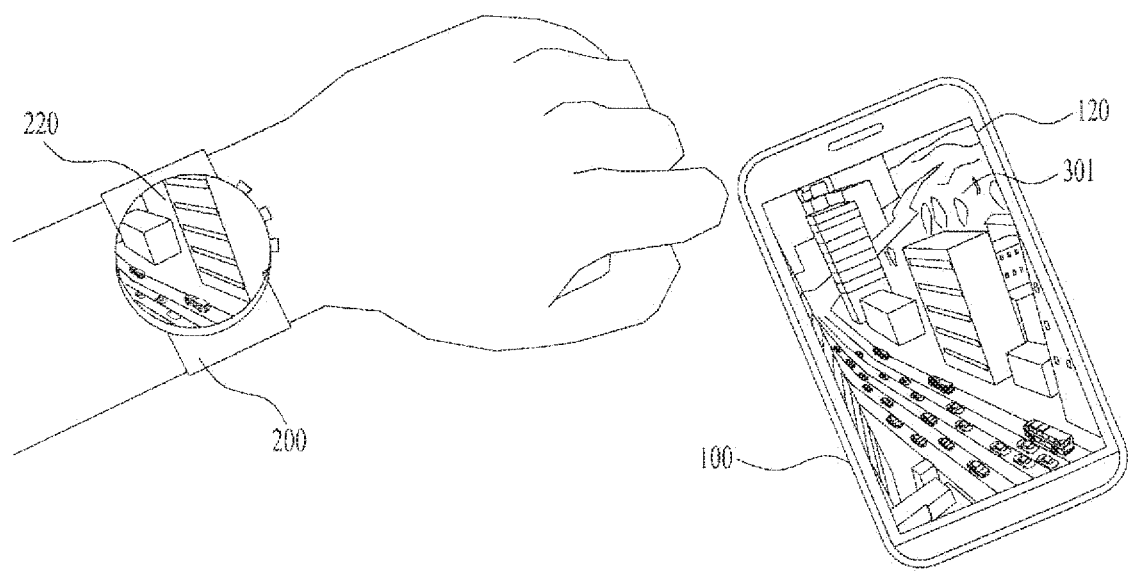

FIGS. 3a to 3c are diagrams for an interface of a mobile device provided according to one embodiment.

Referring to FIG. 3a, a first image 301 is displayed on the display unit 120 of the mobile device 100. A user of the mobile device 100 may want to transmit a part of the first image 301 to the wearable device 200 of the user. For example, the user of the mobile device 100 may want to use the part of the first image 301 as a wallpaper of the wearable device 200.

Referring to FIG. 3b, the user places the wearable device 200 near the mobile device 100. For example, as shown in FIG. 3b, the user may place the wearable device 200 in the vicinity of the rear side of the mobile device 100.

As mentioned earlier with reference to FIG. 2, the mobile device 100 can determine whether or not the wearable device 200 is placed in the vicinity of the mobile device 100 using the detecting unit. For example, if a distance between the wearable device 200 and the mobile device 100 is less than a predetermined distance, the mobile device 100 can determine it as the wearable device 200 is located in the vicinity of the mobile device 100. And, for example, when the wearable device 200 adheres to the rear side of the mobile device 100, the mobile device 100 can determine it as the wearable device 200 is located in the vicinity of the mobile device 100.

If the wearable device 200 is placed in the vicinity of the mobile device 100, the mobile device 100 receives device information of the wearable device 200 from the wearable device 200 using the communication unit. For example, the device information of the wearable device 200 can include at least one selected from the group consisting of a shape, a size, and a resolution of a display unit 220 of the wearable device 200. And, the device information of the wearable device 200 includes a model number and/or a unique number of the wearable device 200. The mobile device 100 can determine at least one selected from the group consisting of a shape, a size, and a resolution of a display unit 220 of the wearable device 200 based on information stored in advance.

Having received the device information of the wearable device 200, the mobile device 100 displays an interface 305 for editing the first image 301 on the first image 301 based on the device information. The wearable device 200 can make the mobile device 100 provide the interface 305 by transmitting the device information of the wearable device 200 to the mobile device 100.

The interface 305 has a form practically identical to the display unit 220 of the wearable device 200. The interface 305 can be changed based on a change of a relative position of the wearable device 200 for the mobile device 100.

For example, as shown in FIG. 3b, if the display unit 220 of the wearable device has a circle shape, the interface 305 of a circle shape can be displayed.

And, the interface 305 can be changed based on a position change changed by a user by moving the wearable device 200 or the mobile device 100 between the wearable device 200 and the mobile device 100. For example, if the wearable device 200 is moved to the upper side in a manner that the user moves a left hand of the user to the upper side, the interface 305 can also be moved to the upper side.

As shown in FIG. 3b, the interface 305 may have a boundary line. And, for example, the first image 301 in the interface 305 may differ from the first image 301 out of the interface 305 in terms of a chroma, brightness, contrast, and/or definition.

The mobile device 100 can provide the interface 305 to a position closest to the wearable device 200. Yet, if the wearable device 200 is placed in the vicinity of the mobile device, the mobile device 100 may provide the interface 305 to a predetermined position. For example, the center of the display unit 120 of the mobile device 100 can be configured as an initial position of the interface 305.

The mobile device 100 can transmit a partial image (e.g., the first image 301 in the interface 305) corresponding to the interface 305 among the first images 301 to the wearable device 200. For example, if a distance between the mobile device 100 and the wearable device 200 is less than a first distance, the mobile device 100 can display the interface 305. And, for example, the mobile device 100 can mirror the first image 301 in the interface 305 to the wearable device 200 after the interface 305 is provided.

After the interface 305 is displayed, if the distance between the mobile device 100 and the wearable device 200 exceeds a second distance, the mobile device 100 can transmit a partial image corresponding to the interface 305 among the first images 301 to the wearable device 200. Hence, a partial image of the first image 301 corresponding to a shape of the display unit 220 of the wearable device 200 is transmitted to the wearable device 200.

As shown in FIG. 3c, having received the partial image, the wearable device 200 can display the received partial image on the display unit 220.

Referring back to FIG. 3b, a user can call out the interface 305 by approaching the wearable device 200 to the mobile device 100. The user can transmit an image preferred by the user to the wearable device 200 by simply moving the wearable device 200 away from the mobile device 100. In particular, the user can copy a picture by simply attaching the wearable device 200 to the mobile device 100 and detaching the wearable device 200 from the mobile device 100. Meanwhile, the mobile device 100 can transmit a partial image to the wearable device 200 based on a separate input as well as the distance between the wearable device 200 and the mobile device 100. For example, if an area in the displayed interface 305 is touched, the mobile device 100 can transmit a partial image of the first image in the interface 305 to the wearable device 200.

Meanwhile, for example, the first image 301 can include a map image. In this case, the mobile device 100 can transmit a geographic coordinate to the wearable device 200 instead of the partial image of the first image 301. In particular, if the first image 301 corresponds to a map image, the mobile device 100 can transmit a geographic coordinate corresponding to a position of the interface 305 to the wearable device 200. Having received the geographic coordinate, the wearable device 200 may start to guide a way based on the received coordinate.

When the mobile device 100 provides the interface 305 to the wearable device 200, the mobile device can provide auditory feedback or tactile feedback to the wearable device 200 together with the interface 305.

The operations of the mobile device 100 and/or the wearable device 200 mentioned earlier with reference to FIGS. 3a to 3c can be combined with each other. In this case, the operations can be selectively combined with operations of the mobile device 100 and/or the wearable device 200 to be explained in the following with reference to FIGS. 4 to 12.

Figure 4:
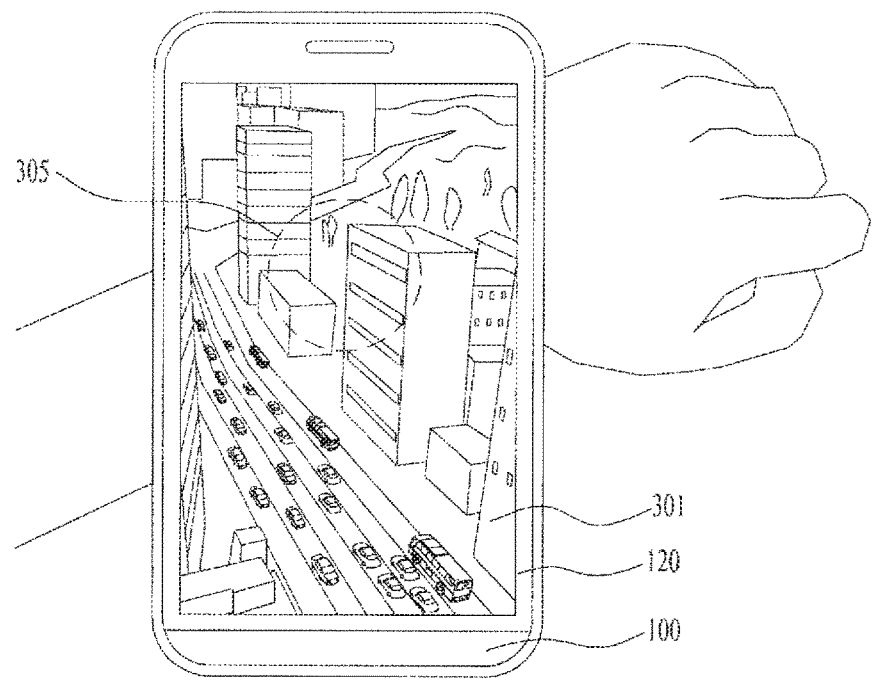
FIG. 4 is a diagram for an example of moving an interface according to one embodiment.
Figure 4:
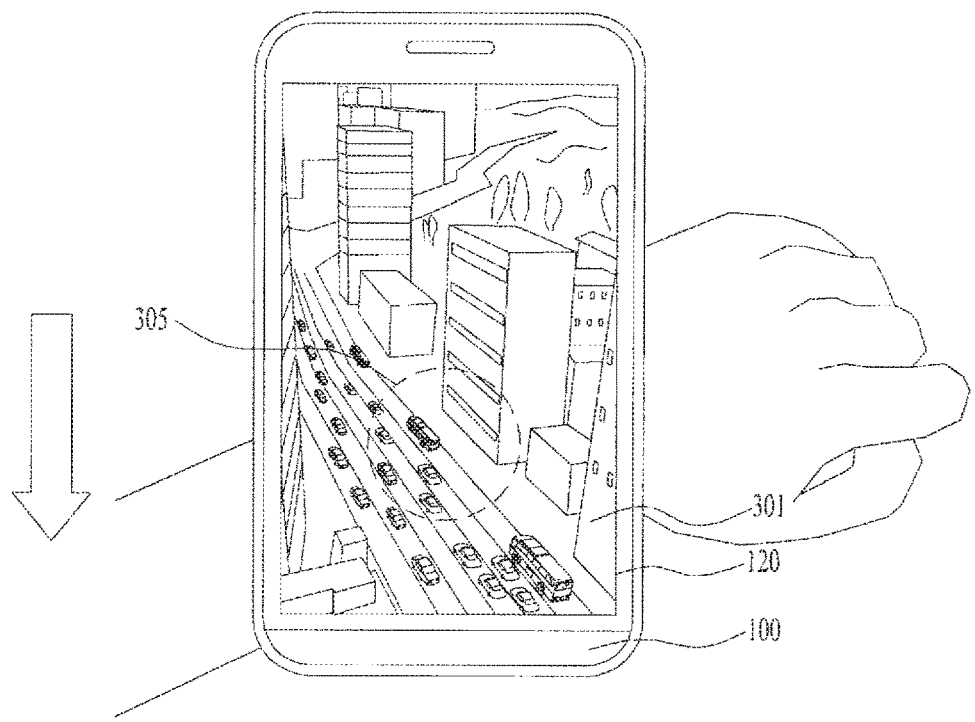

FIG. 4 is a diagram for an example of moving an interface according to one embodiment.

Referring to FIG. 4(a), the wearable device is positioned at the rear side of the mobile device 100 and the interface 305 is displayed on the first image 301 of the mobile device 100. In this case, a user may want to transmit a different part of the first image 301 to the wearable device.

In this case, as shown in FIG. 4(b), the user may move the wearable device 200 in down direction. As a result, a relative position between the mobile device 100 and the wearable device 200 is changed. The mobile device 100 moves a position of the interface 305 based on the change of the relative position. Hence, as shown in FIG. 4(b), the interface 305 is moves to the down direction of the mobile device 100.

In FIG. 4(b), the position of the interface 305 is moved to the down direction of the mobile device 100 by relatively moving the wearable device in down direction for the mobile device 100. Yet, the user can also move the position of the interface 305 to the down direction of the mobile device 100 by relatively moving the mobile device 100 in up direction for the wearable device 200.

The movement of the interface 305 shown in FIG. 4 is just an example only. The user can move the interface 305 in any direction by changing a relative position of the wearable device for the mobile device 100. The operations of the mobile device 100 and/or the wearable device 200 mentioned earlier with reference to FIG. 4 can be selectively combined with operations of the mobile device 100 and/or the wearable device 200 explained in FIG. 3a and FIGS. 5 to 12.

Figure 5:
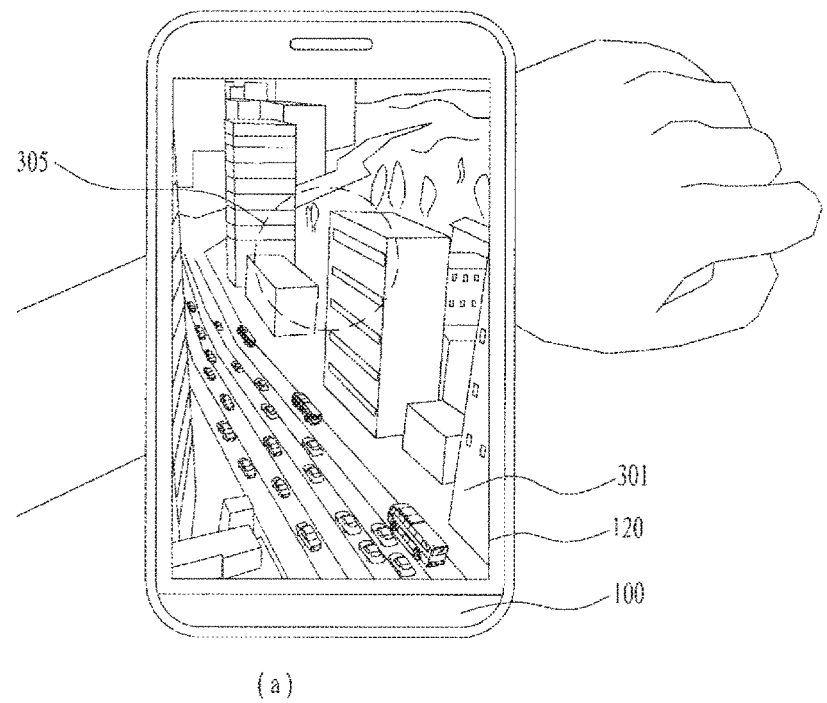
FIG. 5 is a diagram for an example of magnifying an interface according to one embodiment.
Figure 5:
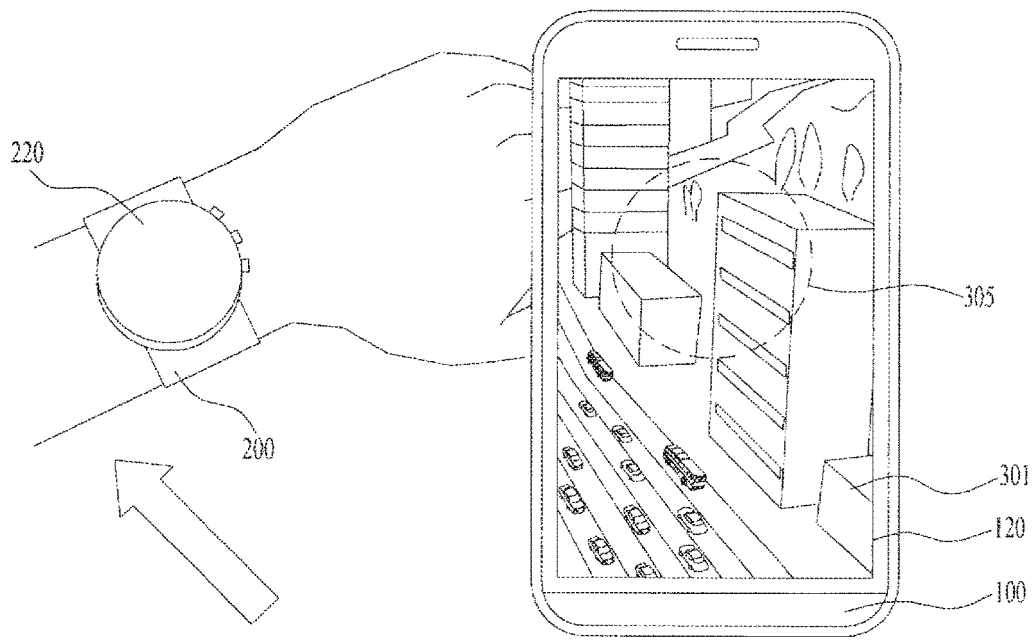

FIG. 5 is a diagram for an example of magnifying an interface according to one embodiment.

Referring to FIG. 5(a), the wearable device 200 is positioned in the vicinity of the rear side of the mobile device 100. In particular, the interface 305 is displayed on the first image 301 based on a shape and a size of the display unit 220 of the wearable device 200. In this case, a user may want to transmit more partial images to the wearable device 200.

Referring to FIG. 5(b), the user moves the wearable device 200 to increase a distance between the mobile device 100 and the wearable device 200. The mobile device 100 can increase a size of the interface 305 based on the increased distance. For example, if a position of the interface 305 is maintained for more than prescribed time, the mobile device 100 can change the size of the interface 305 based on the distance between the mobile device 100 and the wearable device 200. And, if the distance between the mobile device 100 and the wearable device 200 is maintained for more than prescribed time after the size of the interface 305 is changed, the mobile device 100 can transmit a first image 301 corresponding to the changed interface 305 to the wearable device 200. Yet, the mobile device 100 may operate in a mode for changing the size of the interface 305 based on an input inputted on a sub interface described in the following. The mobile device 100 can transmit a first image 301 in the changed interface 305 to the wearable device 200 based on the input inputted on the sub interface described in the following.

Referring to FIG. 5(b), the distance between the mobile device 100 and the wearable device 200 is changed by moving the wearable device 200. Yet, the distance between the mobile device 100 and the wearable device 200 can also be changed by moving the mobile device 100 and the size of the interface 305 can be changed based on the changed distance.

In this case, the distance change changed by moving the wearable device 200 and the distance change changed by moving the mobile device 100 can be performed as a different operation. For example, the mobile device 100 can change a display size of the interface 305 based on a changed distance only when the distance between the mobile device 100 and the wearable device 200 is changed by moving the wearable device 200.

The operations of the mobile device 100 and/or the wearable device 200 mentioned earlier with reference to FIG. 5 can be selectively combined with operations of the mobile device 100 and/or the wearable device 200 explained in FIG. 3a, FIG. 4 and FIGS. 6 to 12.

Figure 6:
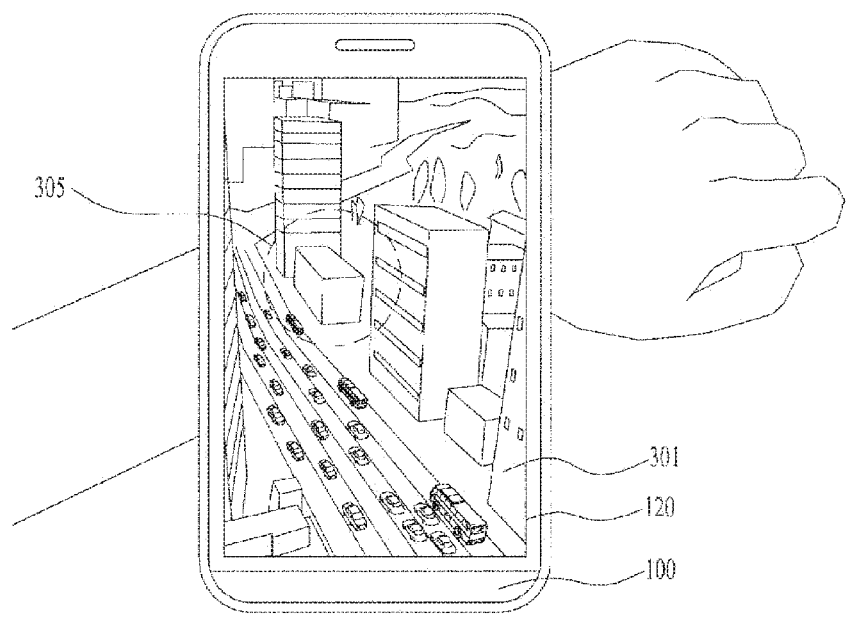
FIG. 6 is a diagram for an example of magnifying an image according to one embodiment.
Figure 6:
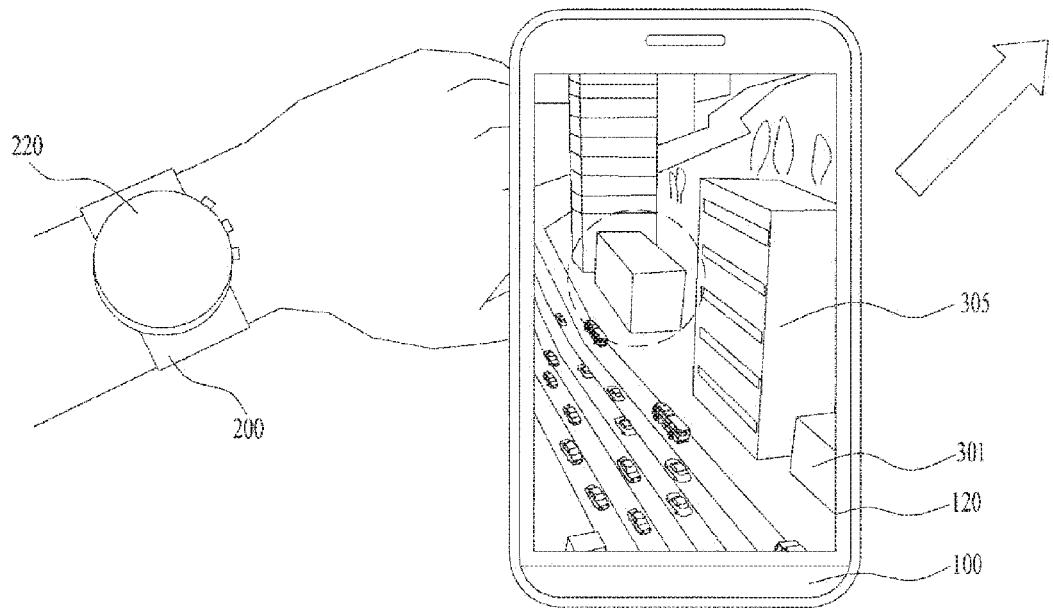

FIG. 6 is a diagram for an example of magnifying an image according to one embodiment.

As mentioned earlier in FIG. 5(b), the size of the interface 305 can be changed based on the distance between the mobile device 100 and the wearable device 200. Yet, a display size of the first image 301 can also be changed based on the distance between the mobile device 100 and the wearable device 200.

Referring to FIG. 6(a), the wearable device 200 is positioned in the vicinity of the rear side of the mobile device 100. In particular, the interface 305 is displayed on the first image 301 based on a shape and a size of the display unit 220 of the wearable device 200.

In this case, a user may want to magnify the first image 301. Referring to FIG. 6(b), the user increases the distance between the mobile device 100 and the wearable device 200 by moving the mobile device 100. The mobile device 100 displays the first image 301 in a manner of magnifying the first image based on the increased distance.

In particular, if the distance between the mobile device 100 and the wearable device 200 is changed due to the movement of the mobile device 100, the mobile device 100 changes a display size of the first image 301 based on the changed distance. For example, the mobile device 100 can magnify the first image 301 on the basis of a position at which the interface 305 is displayed.

Meanwhile, although the distance between the mobile device 100 and the wearable device 200 is changed due to the movement of the wearable device 200, the first image 301 can also be magnified.

And, if the distance between the mobile device 100 and the wearable device 200 is maintained for more than prescribed time after the size of the first image 301 is changed, the mobile device 100 can transmit a first image 301 corresponding to the interface 305 to the wearable device 200. Yet, the mobile device 100 may operate in a mode for changing the size of the first image 301 based on an input inputted on a sub interface described in the following. The mobile device 100 can transmit a first image 301 in the interface 305 to the wearable device 200 based on the input inputted on the sub interface described in the following.

In this case, the distance change changed by moving the wearable device 200 and the distance change changed by moving the mobile device 100 can be performed as a different operation. For example, the mobile device 100 can change a display size of the first image 301 based on a changed distance only when the distance between the mobile device 100 and the wearable device 200 is changed by moving the mobile device 100.

The operations of the mobile device 100 and/or the wearable device 200 mentioned earlier with reference to FIG. 6 can be selectively combined with operations of the mobile device 100 and/or the wearable device 200 explained in FIG. 3a, FIG. 5 and FIGS. 7 to 12.

Figure 7:
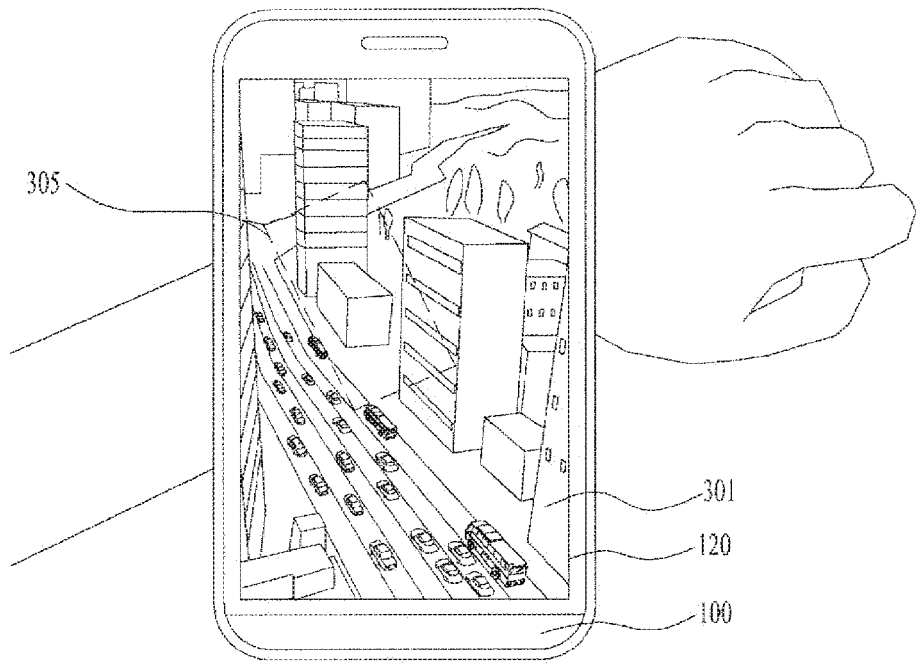
FIG. 7 is a diagram for an example of rotating an interface according to one embodiment.
Figure 7:
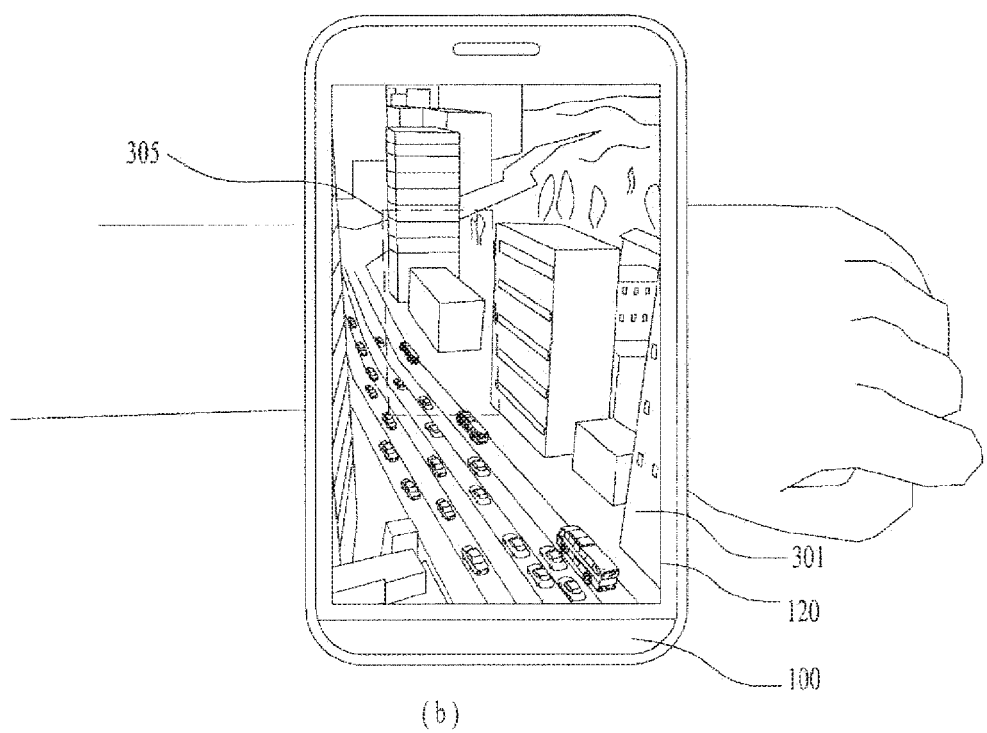

FIG. 7 is a diagram for an example of rotating an interface according to one embodiment.

Referring to FIG. 7, a wearable device (not depicted) is positioned in the vicinity of the rear side of the mobile device 100. The wearable device of FIG. 7 has a display unit of a rectangular shape. This is an example only. The wearable device may have a display unit of a circle shape or a square shape.

Referring to FIG. 7(a), a user places the wearable device in the vicinity of the rear side of the mobile device 100. The mobile device 100 can display an interface 305 of a rectangular shape on a first image 301 based on a shape of the display unit of the wearable device. As shown in FIG. 7(a), the interface 305 can be displayed in a state of being inclined based on an angle of the wearable device worn on a wrist of the user. In this case, the user may want to rotate the interface 305.

The mobile device 100 can rotate the interface 305 on the display unit 120 based on an angle between the display unit 120 of the mobile device 100 and the display of the wearable device. Referring to FIG. 7(b), the user rotates the wrist of the user in a clockwise direction to change the angle between the wearable device and the mobile device 100. The user rotates the wrist of the user on a plane practically parallel to the display unit 120. The mobile device 100 can rotate the interface 305 in a clockwise direction based on the changed angle. Meanwhile, although FIG. 7(b) shows a case that the user rotates the wrist of the user, the user can also rotate the interface 305 by rotating the mobile device 100.

The operations of the mobile device 100 and/or the wearable device 200 mentioned earlier with reference to FIG. 7 can be selectively combined with operations of the mobile device 100 and/or the wearable device 200 explained in FIGS. 3a to 6 and FIGS. 8 to 12.

Figure 8:
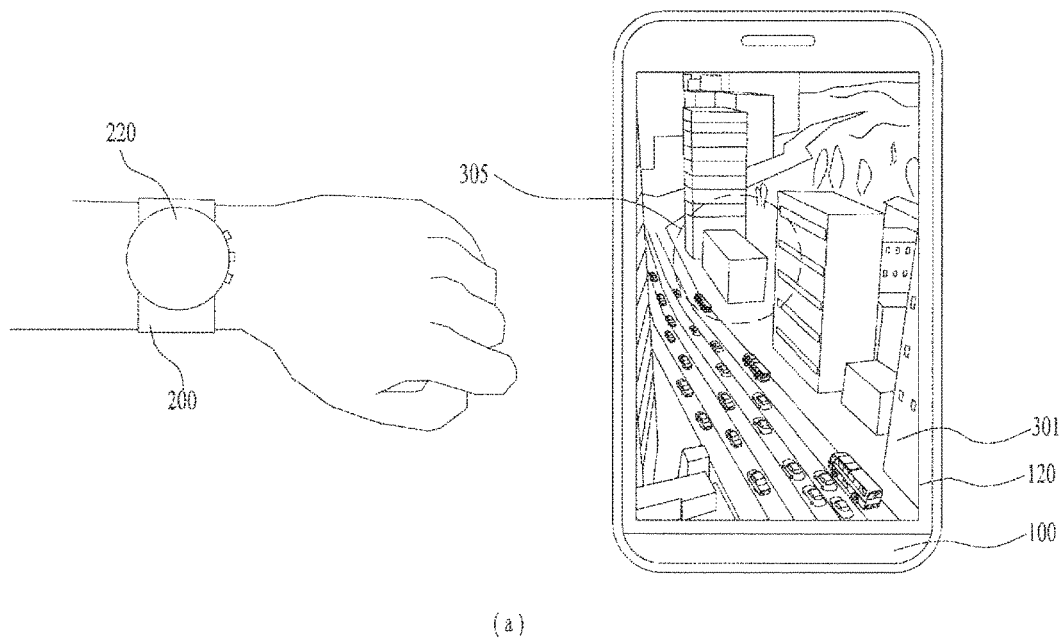
FIG. 8 is a diagram for an example of switching an image according to one embodiment.
Figure 8:
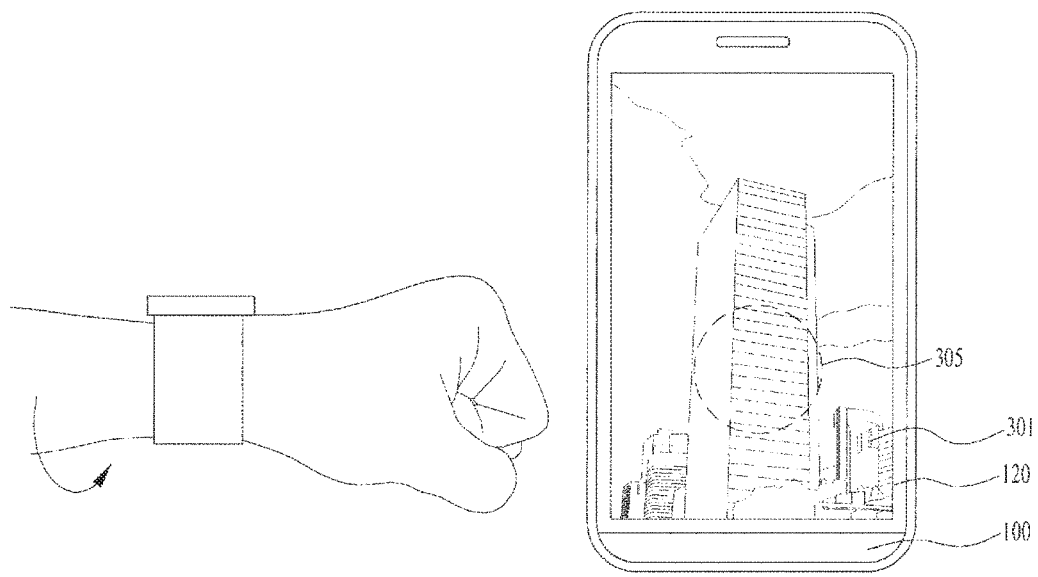

FIG. 8 is a diagram for an example of switching an image according to one embodiment.

In FIG. 8, for clarity, the wearable device 200 and the mobile device 100 are displayed in a manner of being separated from each other. Yet, the wearable device 200 can be displayed in a manner of being adjacent to the mobile device 100. For example, the wearable device 200 can be positioned in the vicinity of the rear side of the mobile device 100.

Referring to FIG. 8(a), the mobile device 100 displays a first image 301 on the display unit 120. If the wearable device 200 is positioned in the vicinity of the mobile device 100, the mobile device 100 displays an interface 305 on the first image 301. In this case, a user may want to edit a different image rather than the first image 301.

Referring to FIG. 8(b), the user rotates the wearable device 200 on the basis of a wrist of the user. The mobile device 100 can display a second image 302 on the display unit 120 instead of the first image 301 based on the rotation of the wearable device 200. In particular, if the wearable device 200 worn on the wrist of the user rotates on the basis of the wrist, the mobile device 100 can change the displayed image with a different image.

For example, the mobile device 100 can display a neighboring image of the displayed image. The mobile device 100 can determine a neighboring direction of an image to be changed based on a direction in which the wearable device 200 rotates.

The digital device 100 can detect the rotation of the wearable device based on image processing. The wearable device 200 can detect the rotation of the wearable device 200 using a gyro sensor. And, the mobile device 100 can detect the rotation of the wearable device 200 based on a signal received from the wearable device 200.

The operations of the mobile device 100 and/or the wearable device 200 mentioned earlier with reference to FIG. 8 can be selectively combined with operations of the mobile device 100 and/or the wearable device 200 explained in FIGS. 3a to 7 and FIGS. 9 to 12.

Figure 9:
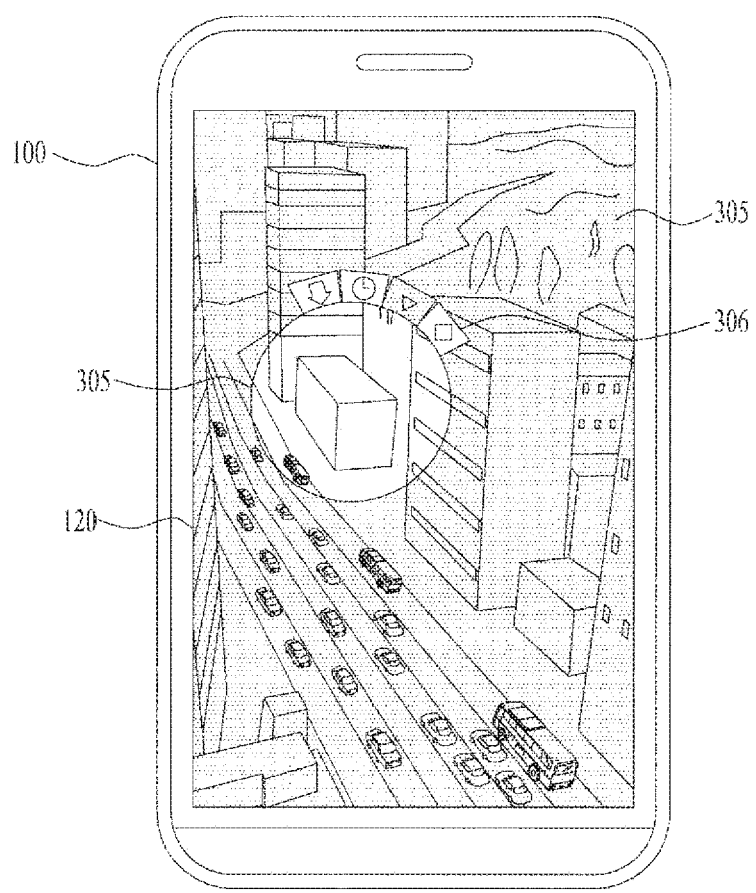
FIG. 9 is a diagram for a sub-interface provided according to one embodiment.

FIG. 9 is a diagram for a sub-interface provided according to one embodiment.

The mobile device 100 can provide a sub interface 306 for editing a first image 301 together with the interface 305. In FIG. 9, although a wearable device is not depicted, the wearable device is positioned in the vicinity of the mobile device 100.

Referring to FIG. 9, the mobile device 100 displays the sub interface 306 for editing the first image 301 and the interface 305 on the first image 301. For example, as shown in FIG. 9, the sub interface 306 can be arranged at the circumference of the interface 305. Yet, the sub interface 306 can be arranged at the top or the bottom of the display unit 120.

As shown in FIG. 9, the sub interface 306 can include a plurality of buttons for editing the first image 301. For example, a plurality of the buttons of the sub interface 306 can include at least one selected from the group consisting of a button for copying the first image 301, a button for cropping, a button for recording the first image 301, a button for stopping recording, and a button for terminating the interface 305. The aforementioned functions of the sub interface 306 are an example only. The sub interface 306 can further include various functions.

For example, if an input for copying is inputted on the sub interface 306, the mobile device 100 can transmit a partial image corresponding to the interface 305 among the first image to the wearable device. As mentioned in the following FIG. 10, the sub interface 306 can provide a function of recording the first image 301 as well.

The operations of the mobile device 100 mentioned earlier with reference to FIG. 9 can be selectively combined with operations of the mobile device 100 and/or the wearable device 200 explained in FIGS. 3a to 8 and FIGS. 10 to 12.

Figure 10:
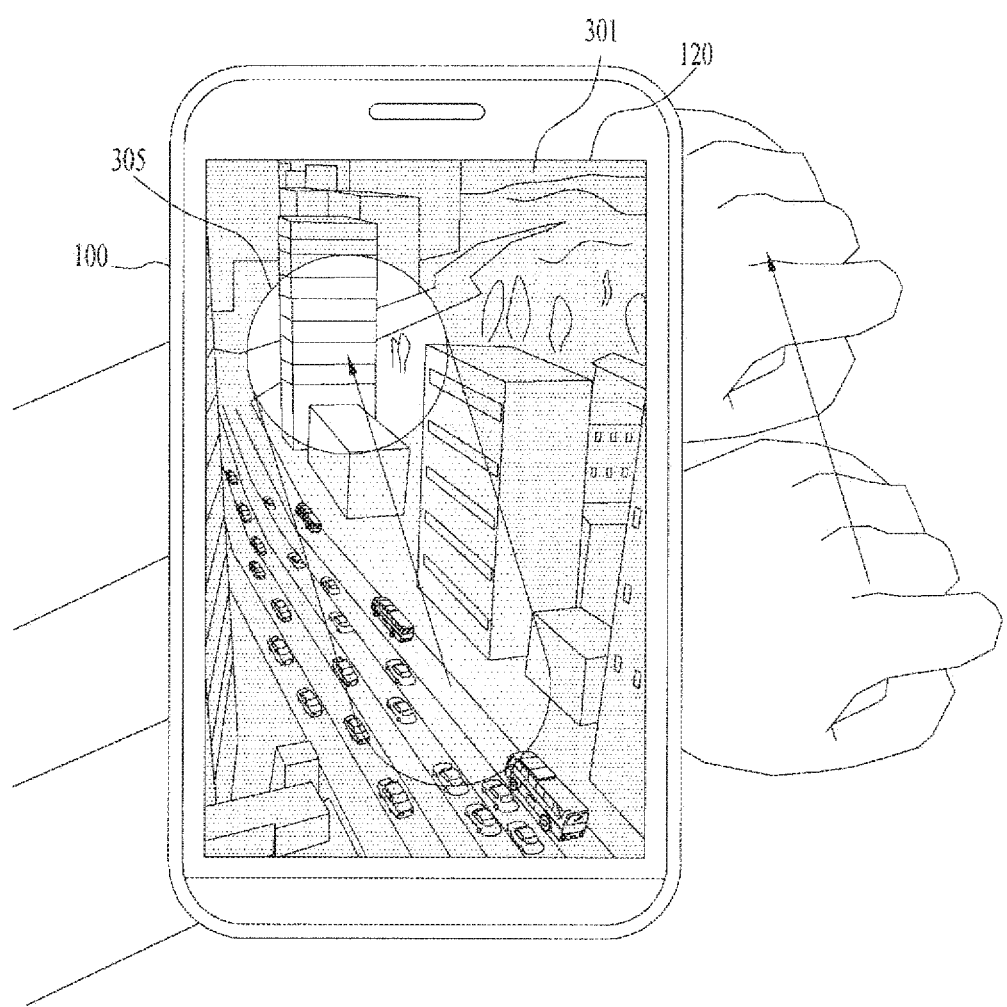
FIG. 10 is a diagram for a method of recording a video according to one embodiment.

FIG. 10 is a diagram for a method of recording a video according to one embodiment.

As mentioned earlier with reference to FIG. 9, the mobile device 100 can record the first image 301 using the sub interface. For example, if an input for recording the first image is received, the mobile device 100 can start to record the first image 301 in the interface 305. If an input for stopping recording of the first image is received, the mobile device 100 can transmit a video of the recorded first image 301 to the wearable device 200.

For example, as shown in FIG. 10, the mobile device 100 can provide the interface 305. In this case, a user may want to make a video corresponding to a wearable device not depicted). For example, the user displays the interface 305 by pacing the wearable device in the vicinity of the mobile device 199 and then inputs an input for recording the first image 301 to the mobile device 100. If the input for recording the first image is received, the mobile device 100 can start to record the first image 301 in the interface 305. The user can move the interface 305 by moving the wearable device. If the interface 305 is moved, the first image 301 in the interface 305 is changed. Hence, a video for the first image 301 is recorded based on the position change of the interface 305. If the recording is completed, the user may input an input for stopping recording to the mobile device 100. Having received the input for stopping recording, the mobile device 100 stops recording the first image 301 and transmits the recorded video to the wearable device. For example, the user may use the received video as a wallpaper of the wearable device.

The operations of the mobile device 100 mentioned earlier with reference to FIG. 10 can be selectively combined with operations of the mobile device 100 and/or the wearable device 200 explained in FIGS. 3a to 9 and FIGS. 11 to 12.

Figure 11:
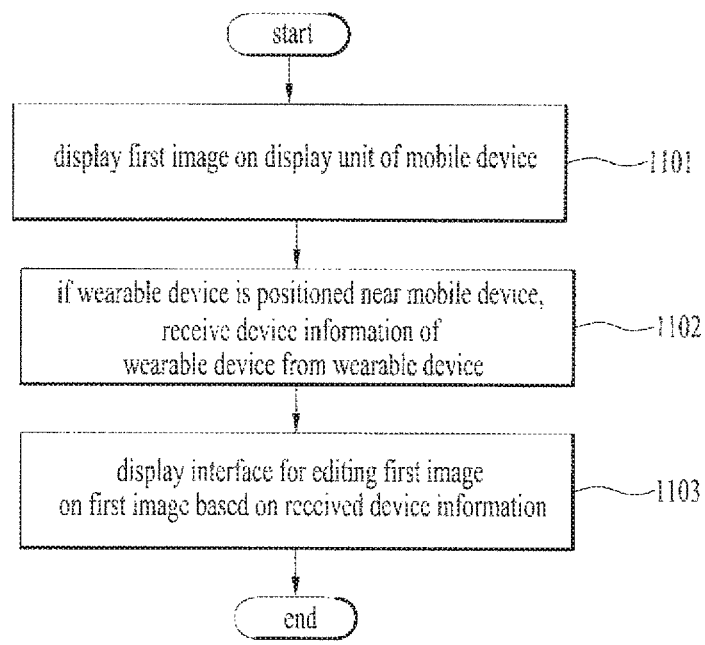
FIG. 11 is a flowchart for a method of controlling a mobile device according to one embodiment.

FIG. 11 is a flowchart for a method of controlling a mobile device according to one embodiment.

The mobile device displays a first image on a display unit of the mobile device [S1101]. If the wearable device is positioned in the vicinity of the mobile device, the mobile device receives device information of the wearable device from the wearable device [S1102]. As mentioned in the foregoing description, the device information can include a size, a shape, a resolution, a name, and a unique number of a display unit of the wearable device. The mobile device can display an interface for editing the first image on the first image based on the received device information [S1103]. As mentioned earlier with reference to FIG. 3a, the mobile device can transmit a partial image corresponding to the interface among the first image to the wearable device. And, the interface has a shape practically identical to the display unit of the wearable device and can be moved based on a change of a relative position of the wearable device for the mobile device.

The method of controlling the mobile device mentioned earlier with reference to FIG. 11 can be selectively combined with the operations explained in FIGS. 3a to 10 and FIG. 12.

Figure 12:
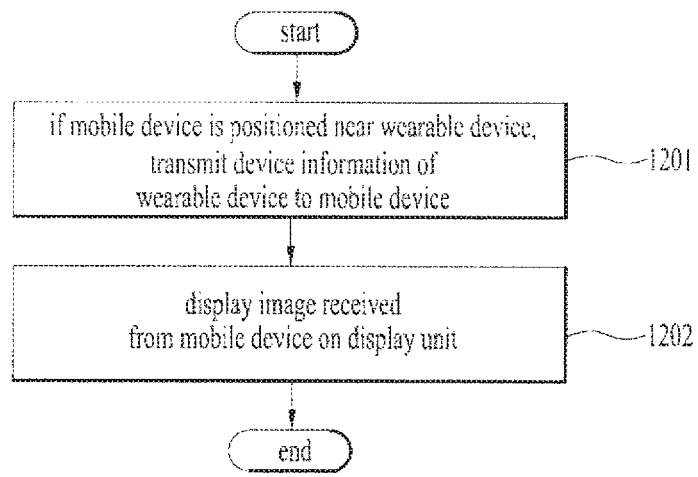
FIG. 12 is a flowchart for a method of controlling a wearable device according to one embodiment.

FIG. 12 is a flowchart for a method of controlling a wearable device according to one embodiment. If the mobile device is positioned in the vicinity of the wearable device, the wearable device can transmit device information of the wearable device to the mobile device [S1201]. If the device information is transmitted to the mobile device, the mobile device can provide an interface for editing an image displayed on the mobile device. In this case, the interface has a shape practically identical to the display unit of the wearable device and can be moved based on a movement of the wearable device. And, the wearable device can display an image received from the mobile device on the display unit [S1202]. As mentioned earlier in FIGS. 3a to 3c, the mobile device can transmit an image to the wearable device based on a predetermined input.

The method of controlling the wearable device mentioned earlier with reference to FIG. 12 can be selectively combined with the operations of the mobile device and/or the wearable device explained in FIGS. 3a to 11.

In the present specification, a wearable device capable of being worn on a wrist of a user is explained as an example. Yet, the wearable device can be worn on a different body part rather than the wrist. The wearable device has a relatively small display unit. In general, the wearable device has a display unit of a shape different from a shape of a display unit of a mobile device. Hence, a wearable device worn on a different body part rather than the wrist can also be included in the wearable device according to the present specification.

A mobile device, a wearable device, and a method of controlling therefor according to the present specification may not limitedly apply to the composition and method of the aforementioned embodiments. The aforementioned embodiments may be configured in a manner of being selectively combined the whole of the embodiments or a part of the embodiments to achieve various modifications.

Meanwhile, a mobile device, a wearable device, and a method of controlling therefor can be implemented with software readable by a processor in a recording media readable by the processor, which is equipped in the digital device. The recording media readable by the processor may include all kinds of recording devices for storing data capable of being read by the processor. The examples of the recording media readable by the processor may include a ROM, a RAM, a magnetic tape, a floppy disc, an optical data storing device and the like. And, implementing in a form of a carrier wave such as a transmission via the internet and the like is also included. And, since the recording media readable by the processor are distributed to the computers connected by a network, codes readable by the processor can be stored and executed in a manner of being distributed.

While the present specification has been described and illustrated herein with reference to the preferred embodiments and diagrams thereof, the present specification may be non-limited to the aforementioned embodiments and it will be apparent to those skilled in the art that various modifications and variations can be made therein without departing from the spirit and scope of the present specification. Thus, it is intended that the present specification covers the modifications and variations of this invention that come within the scope of the appended claims and their equivalents.

MODE FOR INVENTION

Various embodiments have been described in the best mode for carrying out the invention.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

The present invention can be used in a terminal device and is usable in the industry having possibility of repetition.

What is claimed is:

1. A mobile device, comprising:
   a display;
   a communication unit;
   a detecting unit; and
   a processor configured to:
      cause the display to display a first image;
      detect a wearable device positioned near the mobile device via the detecting unit;
      receive device information of the wearable device from the detected wearable device via the communication unit; and
      cause the display to display an interface for editing the first image on the first image based on the received device information,
   wherein the interface has a shape representing to a shape of a display of the wearable device and the interface is changed based on a change of a relative position of the wearable device with respect to the mobile device.

2. The mobile device of claim 1, wherein the processor is configured to:
   cause the display to display the interface on the first image when a distance between the wearable device and the mobile device is less than a first distance; and
   cause the communication unit to transmit a partial image corresponding to the interface to the wearable device when the distance between the wearable device and the mobile device exceeds a second distance after the interface is displayed on the first image.

3. The mobile device of claim 1, wherein the processor is further configured to change a size of the interface based on the distance between the wearable device and the mobile device.

4. The mobile device of claim 1, wherein the processor is further configured to change a display size of the interface based on a change of the distance when the distance between the wearable device and the mobile device is changed due to a movement of the wearable device.

5. The mobile device of claim 1, wherein the processor is further configured to change a display size of the first image based on a change of the distance when the distance between the wearable device and the mobile device is changed due to a movement of the mobile device.

6. The mobile device of claim 1, wherein the processor is further configured to rotate the interface on the display of the mobile device based on an angle between the display of the mobile device and the display of the wearable device.

7. The mobile device of claim 1, wherein:
the wearable device is sized to be worn on a wrist of a user; and
the processor is further configured to replace the displayed first image with a second image when the wearable device rotates according to a movement of the wrist.

8. The mobile device of claim 1, wherein the processor is further configured to cause the display of the mobile device to display a sub interface for providing a control on the first image together with the interface.

9. The mobile device of claim 8, wherein the sub interface comprises at least one selected from the group consisting of copying of the first image, recording of the first image, stopping the recording, and terminating the interface.

10. The mobile device of claim 9, wherein the processor is further configured to copy the first image in the interface and cause the communication unit to transmit the copied first image to the wearable device in response to an input for copying the first image received via the sub interface.

11. The mobile device of claim 9, wherein the processor is further configured to:
Start recording the first image in the interface in response to an input for recording the first image received via the sub interface; and
cause the communication uni to transmit a video of the recorded first image to the wearable device in response to an input for stopping the recording of the first image received via the sub interface.

12. The mobile device of claim 1, wherein the processor is further configured to mirror the first image in the interface to the wearable device when the interface is displayed such that the first image is also displayed on the display of the wearable device.

13. The mobile device of claim 12, wherein the processor is further configured to copy the first image in the interface and cause the communication unit to transmit the copied first image to the wearable device when an area of the displayed interface is touched.

14. The mobile device of claim 1, wherein:
the first image comprises a map image; and
the processor is further configured to cause the communication unit to transmit a geographic coordinate corresponding to a position of the interface on the map image to the wearable device.

15. The mobile device of claim 1, wherein the device information of the wearable device comprises at least one selected from the group consisting of a shape, a size, and a resolution of the display of the wearable device.

16. The mobile device of claim 1, wherein the detecting unit is configured to detect a relative position of the wearable device with respect to the mobile device by sensing one selected from the group consisting of an image of the wearable device, a magnetic field, an electronic field, and a touch input received on a rear side of the mobile device.

17. A wearable device, comprising:
a display configured to display an image;
a communication unit configured to communicate with a mobile device; and
a processor configured to:
control the display and the communication unit;
cause the communication unit to transmit device information of the wearable device to the mobile device when the mobile device is positioned near the wearable device; and
cause the display to display an image received from the mobile device,
wherein the mobile device provides an interface for editing the image displayed on the mobile device in response to the device information received from the wearable device, and
wherein the interface has a shape representing a shape of the display of the wearable device and the interface is changed based on a change of a relative position of the wearable device with respect to the mobile device.

18. A method for controlling a mobile device, the method comprising:
displaying an image on a display of the mobile device;
receiving device information of a wearable device from the wearable device when the wearable device is positioned near the mobile device; and
displaying an interface for editing the image on the image based on the received device information,
wherein the interface has a shape representing a shape of a display of the wearable device and the interface is changed based on a change of a relative position of the wearable device with respect to the mobile device.

19. The method of claim 18, wherein displaying the interface on the image comprises:
displaying the interface on the image when a distance between the wearable device and the mobile device is less than a first distance; and
transmitting a partial image corresponding to the interface to the wearable device when the distance between the wearable device and the mobile device exceeds a second distance after the interface is displayed.

20. A method for controlling a wearable device, comprising:
transmitting device information of the wearable device to a mobile device when the mobile device is positioned near the wearable device; and
displaying an image received from the mobile device on a display of the wearable device,
wherein the mobile device provides an interface for editing an image displayed on the mobile device in response to the device information received from the wearable device, and
wherein the interface has a shape representing a shape of the display and the interface is changed based on a change of a relative position of the wearable device with respect to the mobile device.

* * * * *